US008821012B2

(12) United States Patent
Wang (10) Patent No.: US 8,821,012 B2
(45) Date of Patent: Sep. 2, 2014

(54) COMBINED DEVICE IDENTIFICATION AND TEMPERATURE MEASUREMENT

(75) Inventor: Shen Wang, Rochester, NY (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 71 days.

(21) Appl. No.: 13/406,227

(22) Filed: Feb. 27, 2012

(65) Prior Publication Data

US 2013/0051428 A1 Feb. 28, 2013

Related U.S. Application Data

(63) Continuation-in-part of application No. 13/238,003, filed on Sep. 21, 2011.

(60) Provisional application No. 61/529,287, filed on Aug. 31, 2011, provisional application No. 61/529,288, filed on Aug. 31, 2011.

(51) Int. Cl.
*G01K 7/00* (2006.01)
*G01R 31/00* (2006.01)

(52) U.S. Cl.
USPC .................. 374/163; 374/170; 324/750.15

(58) Field of Classification Search
CPC ......... G01K 7/01; G01K 13/08; G01K 15/00; G01K 15/005; G01K 7/015; G01K 7/16
USPC ................. 374/152, E13.001, 163, 178; 324/750.15, 721
See application file for complete search history.

(56) References Cited

U.S. PATENT DOCUMENTS

| | | | |
|---|---|---|---|
| 4,102,194 A | 7/1978 | Eng | |
| 4,795,918 A | 1/1989 | Menon et al. | |
| 5,441,520 A | 8/1995 | Olsen et al. | |
| 5,508,740 A | 4/1996 | Miyaguchi et al. | |
| 5,880,584 A | 3/1999 | Arai et al. | |
| 6,002,244 A | 12/1999 | Wrathall | |
| 6,647,140 B1 | 11/2003 | Wang et al. | |
| 6,742,349 B1 * | 6/2004 | Kawai et al. | 62/207 |
| 6,815,643 B2 | 11/2004 | Der Ropp | |
| 6,941,536 B2 * | 9/2005 | Muranaka | 716/110 |
| 6,960,753 B2 * | 11/2005 | Cheung | 250/208.2 |
| 7,024,539 B2 * | 4/2006 | Bresemann et al. | 712/36 |
| 7,187,961 B2 | 3/2007 | Yamashita et al. | |
| 7,262,469 B2 * | 8/2007 | Makita | 257/357 |
| 7,265,566 B2 | 9/2007 | Graf | |
| 7,271,780 B2 | 9/2007 | Cok | |
| 7,369,167 B2 | 5/2008 | Bruce et al. | |
| 7,385,491 B2 | 6/2008 | Doi | |
| 7,420,358 B2 | 9/2008 | Byeon et al. | |
| 7,480,588 B1 * | 1/2009 | Walker | 702/132 |
| 7,508,225 B2 * | 3/2009 | Taylor | 324/721 |
| 7,627,455 B2 | 12/2009 | Lenz et al. | |
| 7,660,998 B2 | 2/2010 | Walmsley | |
| 7,691,666 B2 | 4/2010 | Levy et al. | |
| 7,728,401 B2 | 6/2010 | Takatori | |
| 7,786,847 B2 | 8/2010 | Kang | |
| 7,787,034 B2 * | 8/2010 | Ying et al. | 348/247 |
| 7,852,138 B2 | 12/2010 | Kuusilinna et al. | |

(Continued)

*Primary Examiner* — Lisa Caputo
*Assistant Examiner* — Nasir U Ahmed
(74) *Attorney, Agent, or Firm* — Howard & Howard Attorneys PLLC (57) ABSTRACT

Both a device-identification feature and a temperature-sensor feature are combined on a single integrated circuit. In various embodiments, both features are not operative simultaneously.

34 Claims, 8 Drawing Sheets

(56) References Cited

U.S. PATENT DOCUMENTS

| | | |
|---|---|---|
| 7,898,316 B2 | 3/2011 | Pahr et al. |
| 8,029,187 B2 | 10/2011 | Taylor et al. |
| 8,215,230 B2 | 7/2012 | Curtin |
| 8,215,530 B2 | 7/2012 | Milliman |
| 8,303,074 B2 | 11/2012 | Burke |
| 8,330,476 B2 | 12/2012 | Chan et al. |
| 8,415,813 B2 * | 4/2013 | Wang et al. .................. 257/797 |
| 8,445,902 B2 * | 5/2013 | Sato et al. ....................... 257/43 |
| 8,489,782 B2 | 7/2013 | Chadbourne et al. |
| 2006/0067592 A1 | 3/2006 | Walmsley et al. |
| 2006/0284915 A1 | 12/2006 | Han |
| 2007/0262980 A1 * | 11/2007 | Ying et al. .................... 345/418 |
| 2008/0186395 A1 | 8/2008 | Bruce et al. |
| 2008/0198898 A1 | 8/2008 | Taylor et al. |
| 2012/0326736 A1 | 12/2012 | Chadbourne et al. |
| 2013/0049777 A1 | 2/2013 | Wang et al. |
| 2013/0051427 A1 | 2/2013 | Wang et al. |
| 2013/0051428 A1 | 2/2013 | Wang |

* cited by examiner

COMBINED DEVICE IDENTIFICATION AND TEMPERATURE MEASUREMENT

CROSS-REFERENCE TO RELATED APPLICATIONS

This application claims priority to, and the benefits of, U.S. Ser. No. 13/238,003 (the "'003 application") and Ser. No. 13/238,010 (the "'010 application"), both entitled "Device Identification and temperature sensor circuit" and filed on Sep. 21, 2011. The present application is a continuation-in-part of the '003 application, and the entire disclosures of the '003 application and the '010 application are incorporated herein by reference.

FIELD OF INVENTION

The present invention relates generally identification of a device such as an integrated circuit, and measuring the temperature of the device.

BACKGROUND

Performance of an integrated circuit, such as an image sensor, can depend on the temperature. For example, the "dark current" inside an image sensor—i.e., the unwanted current produced by the sensor even during periods when it is not actively exposed to light—is highly temperature-dependent. The dark current will increase with increasing temperature, and higher dark current levels degrade the performance of the image sensor. In particular, as the dark current rises, the dynamic range of the image sensor diminishes and the dark reference level wanders or becomes uncertain, since current flows regardless of the ambient darkness. As a result, various defects may appear in captured images, and if the temperature becomes too high the sensor may sustain permanent damage. Accordingly, the ability to monitor the temperature of an image sensor may be crucial not only to detect and compensate for temperature-induced anomalies, but to protect the sensor from damage.

One conventional technique for measuring the temperature of an image sensor is to mount a thermal couple on the package of the image sensor, either at the front side or at the back side of the package, depending on how the sensor is arranged on the circuit board. The thermal couple can occupy a significant area, however, increasing the size and cost of the sensor and complicating its integration into an image-capture device, such as a camera. Also, over time, the epoxy used to affix the thermal couple to the package can age and loosen, in which case the temperature typically cannot be measured until the loose epoxy is repaired.

Furthermore, different devices may exhibit very different temperature sensitivities. Accordingly, the actions taken in response to a particular temperature reading will be device-specific. Knowing the device temperature, in other words, is insufficient to determine the optimal action to be taken without knowledge of the device and its response to, and tolerance of, temperature variations.

SUMMARY

In various embodiments, the present invention implements both a device-identification feature and a temperature-sensor feature on a single integrated circuit without introducing an extra bond pad or package pin. Manufacturers of products that currently use either of the features can now utilize both with minimum modifications to the current electronics. Integrated circuits, such as image sensors, having unique features can use the device-identification feature to automatically identify the integrated circuit and/or to implement or optimize settings, programs, and operating conditions based on the device's specification. The device-identification feature allows manufacturers to design a single system that may be deployed on different integrated circuits or other devices. Additionally, the temperature-sensor feature can be used to periodically or continuously monitor the temperature of the integrated circuit and prevent device failures due to overheating. It can also perform or facilitate some image-improvement algorithms such as dark current subtraction at different temperatures. To prevent or limit dark current from the temperature sensor, an opaque layer may cover the temperature sensor (and, in various implementations, the region surrounding it).

In one aspect, the invention pertains to an integrated circuit including thereon a device-identification circuit for identifying the integrated circuit, a temperature sensor, and an opaque layer covering at least the temperature sensor to prevent photocurrent generation therein. The device-identification circuit and the temperature sensor are not simultaneously operable. In some embodiments, the device-identification circuit comprises a resistor connected to a diode-connected transistor; the temperature sensor may be a diode connected in parallel with the device-identification circuit. The integrated circuit may be or comprise an image sensor.

In another aspect, the invention relates to an integrated circuit including thereon, in various embodiments, a device-identification circuit comprising a resistor connected between a diode-connected transistor and a first reference voltage, where the diode-connected transistor has a first polarity applied relative to the first reference voltage; a temperature sensor diode connected in parallel with the device-identification circuit and having a second polarity applied to a second reference voltage; and an opaque layer covering at least the temperature sensor to prevent photocurrent generation therein. Once again, the integrated circuit may be or comprise an image sensor.

A further aspect of the invention pertains to a system for identifying a device and to measure its temperature, in which the system has a power supply connected to a common node. In various embodiments, the inventive system comprises a device-identification circuit connected between the common node and a first reference voltage; a temperature sensor connected (i) in parallel with the device-identification circuit and (ii) between the common node and a second reference voltage; and an opaque layer covering at least the temperature sensor to prevent photocurrent generation therein.

In some embodiments, the device-identification circuit includes a diode-connected transistor connected to a resistor; the diode-connected transistor has a first polarity and is connected to the common node, and the resistor is connected between the diode-connected transistor and the first reference voltage. The temperature sensor may be a diode having a second polarity. A second resistor may be connected between the power supply and the common node. In a representative implementation, the power supply and the second resistor are disposed in an image-capture device; for example, the device-identification circuit and the temperature sensor diode may be disposed in an image sensor.

The system may, in various embodiments, further include a processor connected to the integrated circuit; a memory connected to the processor; and a driver circuit connected to the processor and to the integrated circuit. The memory may contain a look-up table relating different resistance values to associated devices, with the processor being configured to identify the device based on a substantial match between a value in the look-up table and a value of the identification-circuit resistor. In some embodiments, the memory contains a look-up table relating different values of an electrical parameter of the temperature sensor to associated temperatures, and the processor is configured to identify a device temperature based on a substantial match between a present value of the electrical parameter and a value in the look-up table. In some implementations, the sensor comprises a diode and the electrical parameter is current through the diode or voltage across the diode.

Still another aspect of the invention pertains to a method for identifying an integrated circuit and determining its temperature. In various embodiments, the method comprises using a device-borne device-identification circuit to identify the device; and using a device-borne temperature sensor to report the temperature of the device. The device-identification circuit and the temperature sensor may be connected in parallel and not operated simultaneously, and light is preferably blocked from at least the temperature sensor to prevent photocurrent generation therein. The device-identification circuit may comprise a resistor connected to a diode-connected transistor, and the temperature sensor may comprise a diode connected in parallel with the device-identification circuit.

The integrated circuit can be identified by determining the value of the resistor included in the device-identification circuit, and identifying the integrated circuit based on the determined resistance value. For example, known resistance values for different integrated circuits can be maintained in a look-up table. The temperature of the integrated circuit can be determined by measuring an electrical parameter of the temperature sensor (e.g., diode), comparing the measured parameter against a plurality of parameter values associated with known temperatures, and determining the temperature of the integrated circuit based on the comparison. In one embodiment, the electrical parameter is the level of current through the diode. In another embodiment, the electrical parameter is the voltage across the diode.

In one configuration, the device-identification circuit and the temperature-sensor diode are connected to a common node, and the method further comprises applying a first voltage to the common node to place (i) the device-identification circuit in an ON state to identify the integrated circuit and (ii) the temperature-sensor diode in an OFF state. The method may also include applying a second voltage to the common node to place (i) the device-identification circuit in an OFF state and (ii) the temperature-sensor diode in an ON state to determine a temperature of the integrated circuit.

BRIEF DESCRIPTION OF THE DRAWINGS

Embodiments of the invention are better understood with reference to the following drawings. The elements of the drawings are not necessarily to scale relative to each other.

DETAILED DESCRIPTION

Throughout the specification and claims the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on," "over," "top," and "bottom" are used with reference to the orientation of the figure(s) being described. Because components of embodiments of the present invention can be positioned in a number of different orientations, the directional terminology is used for purposes of illustration only and is in no way limiting. When used in conjunction with layers of an integrated circuit wafer or corresponding integrated circuit, the directional terminology is intended to be construed broadly, and therefore should not be interpreted to preclude the presence of one or more intervening layers or other intervening integrated circuit features or elements. Thus, a given layer that is described herein as being formed on or formed over another layer may be separated from the latter layer by one or more additional layers.

The term "substrate" is to be understood as a semiconductor-based material including, but not limited to, silicon, silicon-on-insulator (SOI) technology, doped and un-doped semiconductors, epitaxial layers formed on a semiconductor substrate, and other semiconductor structures. The terms "substantially" and "approximately" mean±10% and, in some embodiments, ±5%. In the drawings, like numbers indicate like parts throughout the views.

Figure 1:
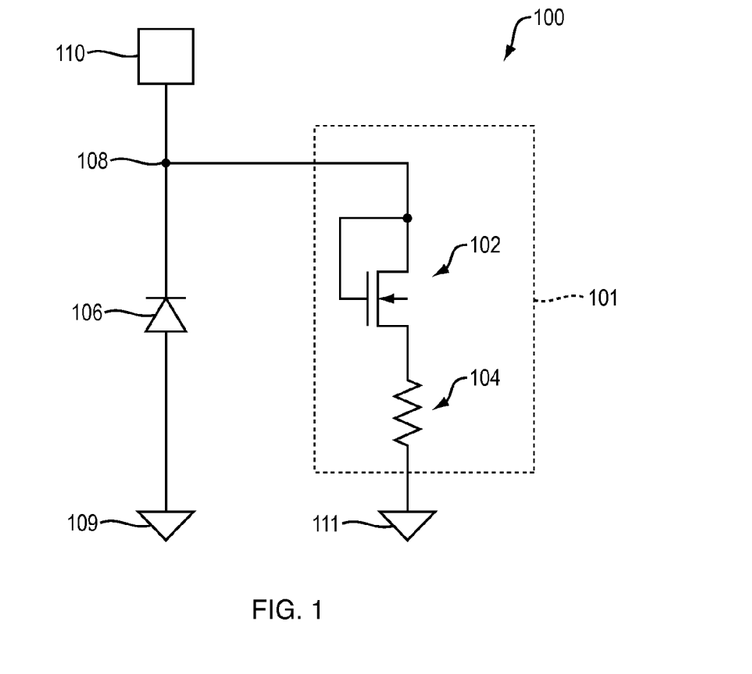
FIG. 1 is a schematic diagram of a device identification and temperature sensor circuit in an embodiment in accordance with the invention.

Refer first to FIG. 1, which illustrates a representative device identification and temperature sensor circuit implemented in accordance with the invention. The device-identification circuit 101 is connected in parallel with a temperature-sensor diode 106. Device-identification circuit 101 and temperature-sensor diode 106 are connected to a common node 108 and also to a pair of reference voltages 109, 111. The reference voltages can be one common voltage, such as ground, or two different voltages.

Device-identification circuit 101 includes diode-connected transistor 102 connected in series with resistor 104. Temperature-sensor diode 106 is implemented as a PN junction diode and diode-connected transistor 102 as a diode-connected metal-oxide-semiconductor field-effect transistor (MOSFET) in an embodiment in accordance with the invention. The impedance of diode-connected transistor 102 may be smaller than the resistance value of resistor 104.

The anode of temperature-sensor diode 106 is connected to the reference voltage 109, which can be ground as shown or another other reference voltage. The cathode is connected to common node 108, which is itself connected to a bond pad 110. The forward current across diode 106 depends on temperature. The Shockley diode equation relates the diode current I of a PN junction diode to the diode voltage V. This relationship is known as the diode I-V characteristic, which can be characterized by the equation, $$I = I_S \left( e^{\frac{qV}{nkT}} - 1 \right) \quad \text{Equation 1}$$

where I is the forward current through the diode, $I_s$ is the reverse bias saturation current, V is the voltage across the diode, T is temperature of the PN junction in Kelvins, and n is a junction constant (typically around 2 for diode). The parameters q and k are constants, where k is Boltzmann's constant ($1.38 \times 10^{-23}$ joule/K) and q is the magnitude of charge on an electron ($1.6 \times 10^{-19}$ coulomb).

Figure 2:
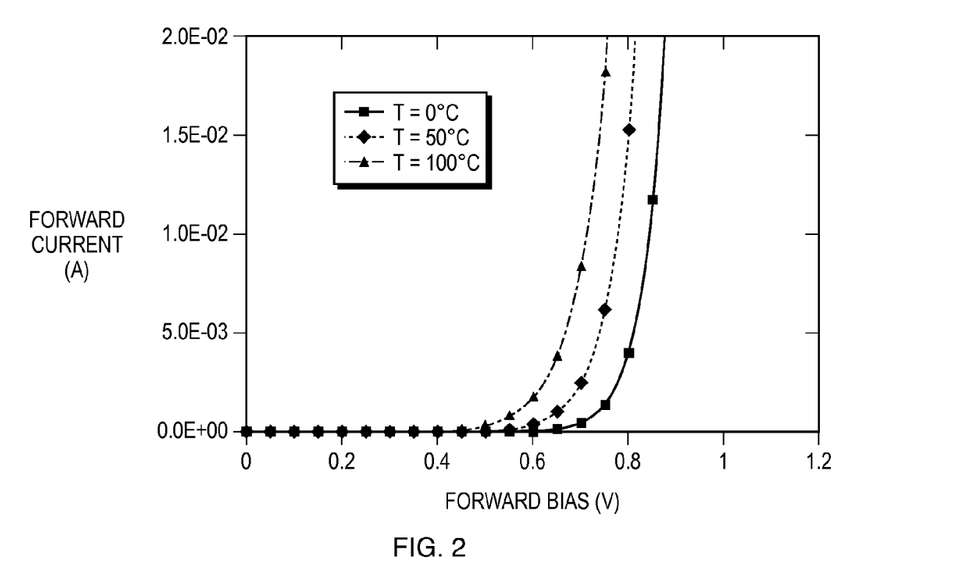
FIG. 2 illustrates examples of I-V curves of a PN junction diode at different temperatures in an embodiment in accordance with the invention.

The reverse saturation current can be defined by the equation, $$I_S = I_C e^{-\frac{qE_g}{nkT}} \quad \text{Equation 2}$$

where $I_c$ is a current constant and $E_g$ is the diode material bandgap (1.12 eV for silicon). From Equations 1 and 2, diode I-V curves versus temperature can be calculated and plotted, as shown in FIG. 2. Three I-V curves for temperatures of 0° C., 50° C., and 100° C. are illustrated in FIG. 2. The three I-V curves show the forward current through a diode increases with temperature.

Figure 3:
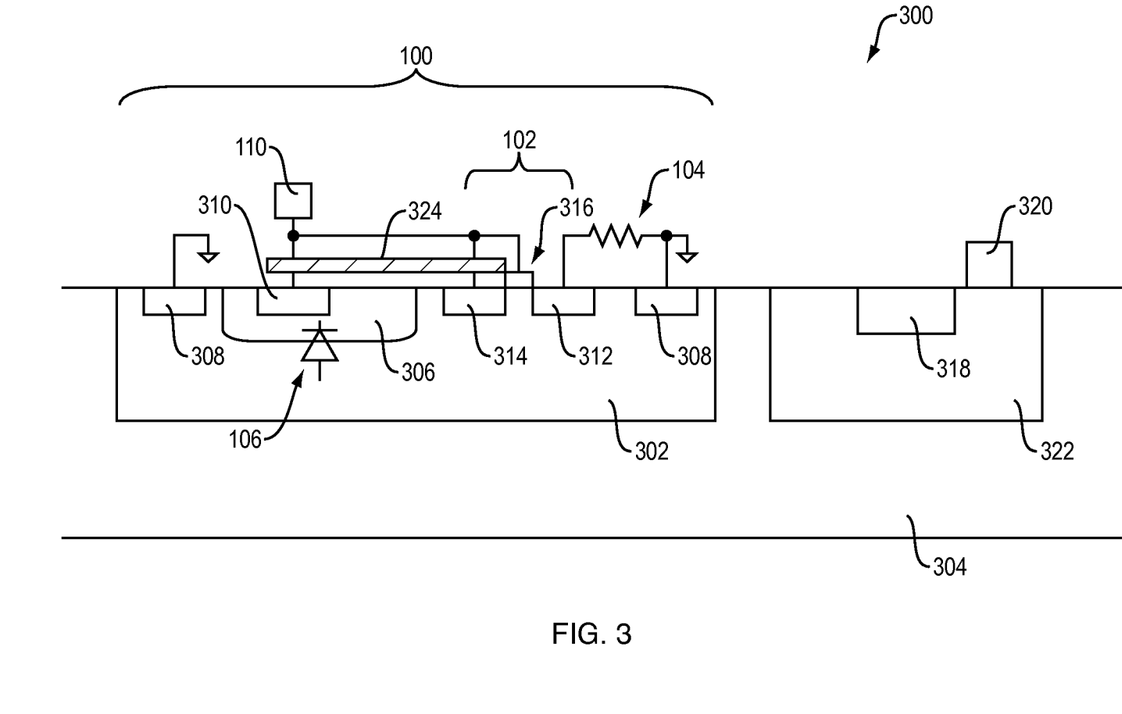
FIG. 3 is a cross-sectional view of a portion of a first integrated circuit that includes device identification and temperature sensor circuit 100 in an embodiment in accordance with the invention.

Refer now to FIG. 3, which illustrates a representative integrated device including the device-identification and temperature-sensor circuit 100. A well 302 is disposed in substrate 304. Well 302 is a p-type well and substrate 304 an n-type substrate in an embodiment of the invention. A temperature-sensor diode 106 is formed between p-type well 302 and an n-type well 306 disposed in p-type well 302. The anode of the diode 106 is connected to a ground through a contact (not shown) in the p-select region 308. The cathode of diode 106 is connected to bond pad 110 through a contact in the n-select region 310. N-select region 310 is disposed in n-type well 306.

Diode-connected transistor 102 is also built in p-type well 302 with the source region 312 and the drain region 314 of transistor 102 disposed in p-type well 302. Source region 312 and drain region 314 are n-type regions in an embodiment in accordance with the invention. The gate 316 of diode-connected transistor 102 is tied to drain region 314, and both the gate 316 and drain region 314 are connected to bond pad 110. Source region 312 is connected to one end of resistor 104. The other end of resistor 104 is connected to the same ground that is connected to temperature-sensor diode 106 through a contact in p-select region 308. Resistor 104 may be made of polysilicon material.

In the illustrated embodiment, one or more additional circuits or components 318, 320 are constructed in or on well 322. In one embodiment, well 322 is a p-type well. A current flows through p-type well 302 into n-type well 306 when diode 106 is forward-biased. The size (i.e., current-carrying capacity) of the temperature diode 106 is much larger than that of the transistor 102 to minimize the impact of the current flow from the transistor 102 when a negative voltage is applied to the bond pad. The p-type wells 302 and 322 can be formed separately to prevent the diode current from affecting the performance of the one or more additional circuits or components 318, 320. In addition, diode 106 and resistor 104 can both be connected to a reference level other than ground, or connected separately to two different reference levels including ground.

In certain embodiments, the temperature diode 106 is covered by an opaque layer 324 to prevent light from reaching temperature diode 106, since a photocurrent will be created by light. This photocurrent will add to the diode forward current when the diode is turned on by a negative voltage through the bond pad 110, and therefore distort the I-V curves shown in FIGS. 6 and 8 if the light level varies. The opaque layer 324 can be a metal layer such as tungsten or aluminum, or color filter material. There may be openings (not shown) in the opaque layer 324 to facilitate circuit connections and avoid shorts.

In some implementations, not just diode 106 but also the region surrounding the diode 106 is covered by opaque layer 324. For example, since the drain region 314 of the transistor 102 also forms a p-n junction diode connecting to the temperature diode 106, its current also contributes to the total current of the temperature diode. Therefore, the opaque layer 324 may cover the drain region 314 as depicted in FIG. 3. Those skilled in art will appreciate that the opaque layer 324 can cover a larger region than that shown in FIG. 3. For example, the opaque layer 324 can cover the temperature diode 106, the region of transistor 102 in addition, or even the entire circuit 100.

Figure 4:
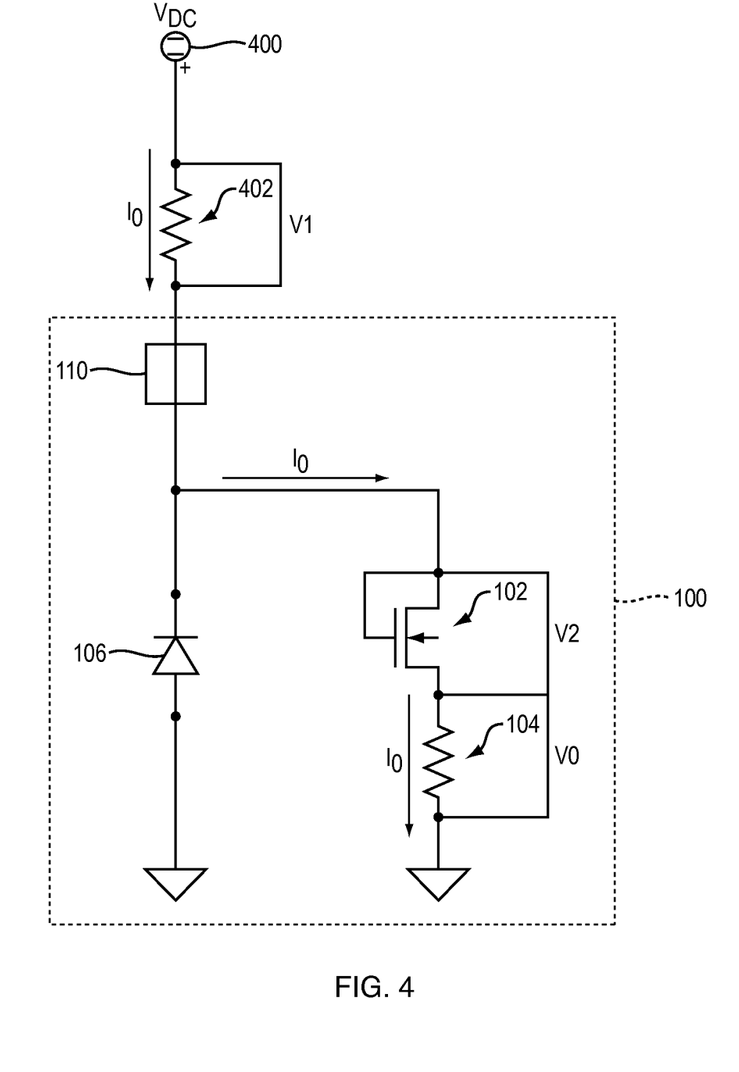
FIGS. 4 and 5 are schematic diagrams depicting one example of an external circuit connected to device identification and temperature sensor circuit 100 shown in FIG. 1.

FIG. 4 is a schematic diagram depicting an exemplary external circuit connected to bond pad 110 (see FIG. 1). Power supply 400 supplies a positive voltage $V_{dc}$ to bond pad 110 through a known resistor 402 (having a resistance $R_1$). The positive voltage at the anode of temperature-sensor diode 106 turns off the diode and turns on diode-connected transistor 102. The actual turn-on voltage of diode-connected transistor 102 depends upon the characteristics of transistor 102, including the threshold voltage $V_t$. Diode-connected transistor 102 turns on because gate 316 and drain 314 are tied together. Therefore, a current $I_0$ flows only through diode-connected transistor 102 and resistor 104. The current $I_0$ is equal to $V_1/R_1$, where $V_1$ is the voltage across resistor 402. Since the impedance $R_2$ of diode-connected transistor 102 is significantly smaller than the resistance value of resistor 104, the voltage drop $V_2$ across diode-connected transistor 102 is negligible compared to the voltage drop $V_0$ across device-identification resistor 104. Therefore, the resistance value of device-identification resistor 104 can be calculated as $(V_{dc}-V_1)/I_0$, or $R_1(V_{dc}-V_1)/V_1$. On the other hand, if the impedance $R_2$ of the transistor 102 is comparable to the resistance value of resistor 104, the resistance value of device-identification resistor 104 can be calculated as $$(V_{dc}-V_1-V_2)/I_0, \text{ or } R_1(V_{dc}-V_1)/V_1-R_2.$$

An integrated circuit that uses a device-identification and temperature-sensor circuit can provided with a resistor 104 having a device-specific resistance value, so that different integrated circuits each have a unique value for resistor 104. If a calculated resistance value for resistor 104 matches or substantially matches (e.g., within a statistical margin of error) the known resistance value associated with a particular integrated circuit, the identity or type of the integrated circuit can be determined based on the match. The list of known resistance values can cover variety of integrated circuits. By way of example only, the list can be implemented as a look-up table stored in a memory. An apparatus that includes the identified integrated circuit can then automatically select the correct hardware or software configuration for the identified integrated circuit, or perform operations specific for that integrated circuit.

Figure 5:
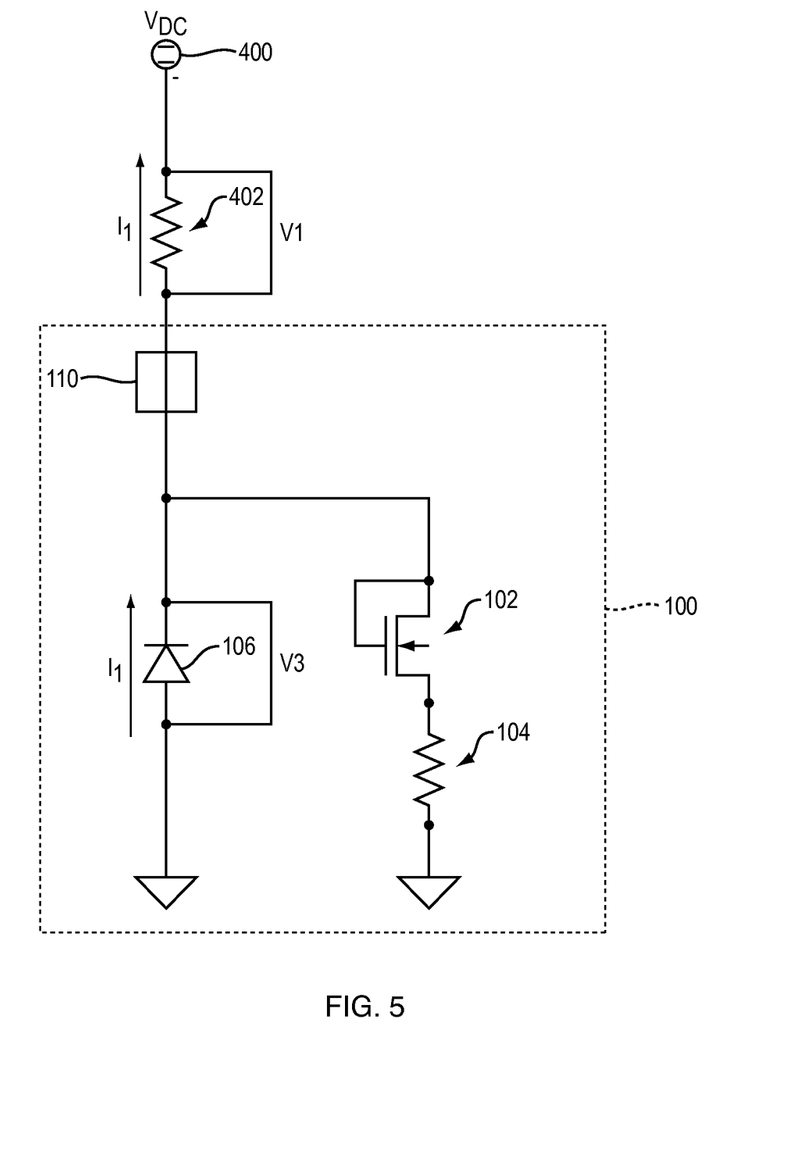

Use of the temperature sensor to measure temperature is illustrated in FIG. 5. A negative voltage ($-V_{dc}$) applied as shown by a power supply 400 turns off diode-connected transistor 102 and prevents any current flow along the path of the device-identification circuit, which includes resistor 104. The negative voltage at the cathode of temperature-sensor diode 106 places the diode in a forward-biased state, and a forward current $I_1$ will flow through diode 106 and through resistor 402. The current $I_1$ through resistor 402 is given by $V_1/R_1$, where $V_1$ is the voltage across resistor 402 and $R_1$ is the resistance value of resistor 402. Since the drain region of the transistor 102 is n-type and is inside a p-type well, a forward-biased current will flow into the bond pad 110 as well when the negative voltage is applied from the power supply 400. Because the size of the temperature diode is much larger than the transistor 102, the current flowing from the drain region of the transistor 102 is much smaller than the current flowing from the temperature diode. Therefore, the current $I_1$ is close to the current flowing through temperature-sensor diode 106. The voltage $V_3$ across temperature-sensor diode 106 can then be calculated by subtracting $V_1$ from ($-V_{dc}$). Since the relationship between $I_1$ and $V_3$ across temperature-sensor diode 106 is temperature-dependent, the temperature can be determined by comparing the data set ($I_1$, $V_3$) with voltage/current data sets determined at different temperatures. The data sets are obtained and may be stored in a memory (not shown). By way of example only, the pre-determined data sets can be stored as a look-up table, which is described in more detail in conjunction with FIGS. 6-9.

In various embodiments, the circuitry implementing device identification and temperature sensing is designed so that only one of the two elements in circuit 100 is turned on and operating at any given time. The threshold voltage of the diode-connected transistor 102 may be non-zero and positive. For example, the threshold voltage can be one volt above zero, so that the impact of the leakage current of diode-connected transistor 102 on temperature measurement is small and insignificant when the voltage becomes negative. One way to increase the threshold voltage of diode-connected transistor 102 is to implant a different type of dopant into the channel. For a NMOS transistor, the dopant can be boron, for example.

At any time, either (but not both of) the device-identification circuit 101 or the temperature sensor 106 may be operating in an ON state. The device-identification circuit 101 may have a first polarity and the temperature sensor may have a second polarity different from the first polarity, where polarity is defined as a positive voltage change or a negative voltage change relative to a reference voltage.

Once a device is identified using the device-identification circuit 101, temperature-sensor diode 106 can periodically or continuously monitor the temperature of the integrated circuit while the integrated circuit is operating. For example, when the integrated circuit is an image sensor that is included in a security camera, the security camera can monitor the temperature of the image sensor while capturing images or video. If the temperature of the image sensor rises above a device-specific threshold indicating the temperature is too high, the camera can shut down automatically for a period of time to prevent damage to the image sensor due to high temperature.

Figure 6:
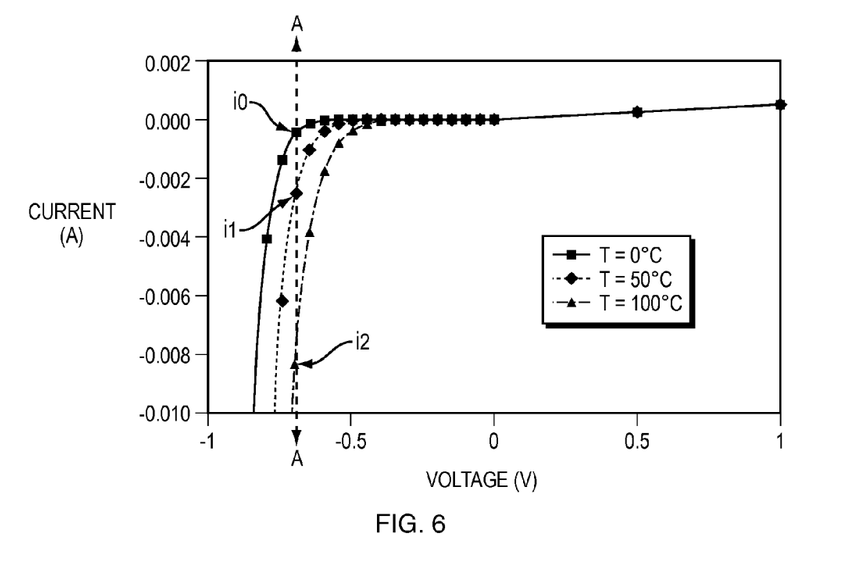
FIG. 6 is a simulated I-V curves based on the circuit shown in FIGS. 4 and 5 in an embodiment in accordance with the invention.
Figure 7:
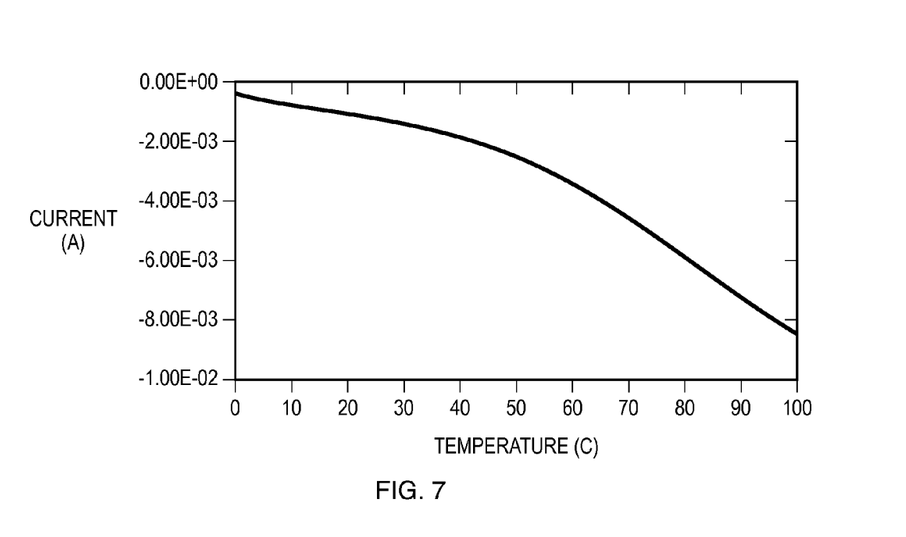
FIG. 7 depicts a relationship between diode current and temperature along line A-A in FIG. 6 in an embodiment in accordance with the invention.

FIG. 6 illustrates simulated I-V curves based on the circuit shown in FIGS. 4 and 5. One method that can be used to determine the temperature of an integrated circuit using temperature-sensor diode 106 is to compare different current values obtained at a constant voltage. The current values at different temperatures are obtained along the vertical line A-A when the voltage is constant at −0.7V. FIG. 7 shows the relationship between the diode current and the temperature when the voltage is at −0.7V in an embodiment of the invention. The temperature of the device can be obtained by measuring the device current and locating the corresponding temperature in curve 700.

The current values can be included in a look-up table saved in a memory. For example, if the integrated circuit is an image sensor, the look-up table can be saved in a memory in an image-capture device. When the temperature is to be measured, the diode current can be calculated using the approach described earlier. Then the temperature of the image sensor can be obtained by matching the diode current with one of the diode currents stored in the look-up table. If the measured current falls in between two current values in the look-up table, a linear (or nonlinear) interpolation may be performed.

Figure 8:
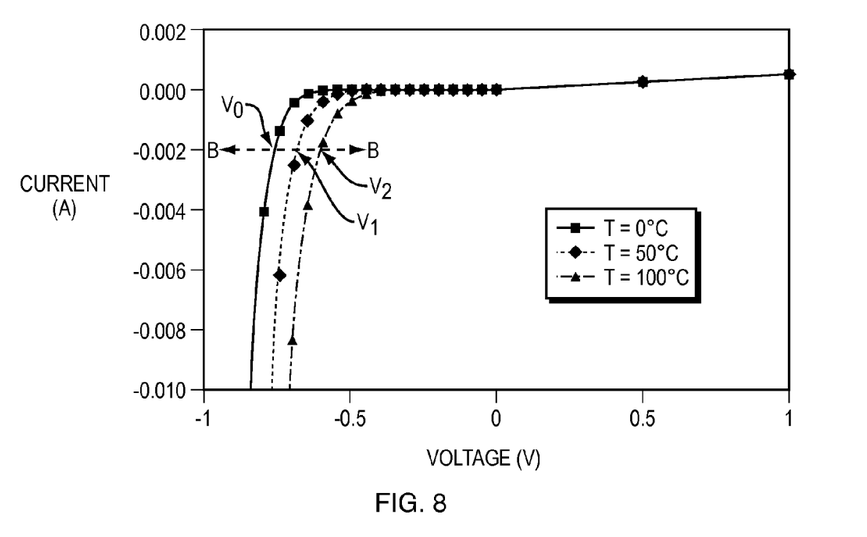
FIG. 8 depicts a relationship between diode current and temperature for different voltages at different temperatures obtained along line B-B in an embodiment in accordance with the invention.
Figure 9:
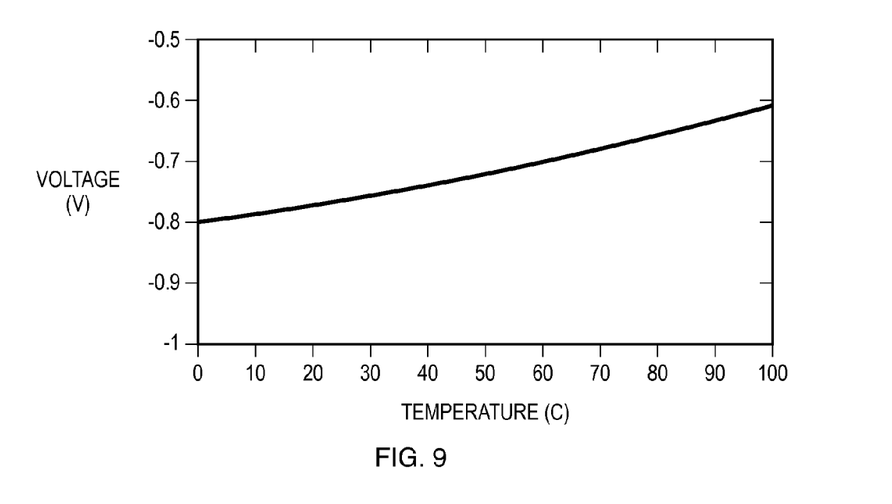
FIG. 9 depicts the relationship between the diode current and the diode temperature when the current is at the particular current represented by line B-B in FIG. 8.

Another approach to determining temperature is comparing different voltages at a constant current. FIG. 8 depicts a relationship between diode current and temperature for different voltages at different temperatures obtained along line B-B in an embodiment of the invention. The voltage values at different temperatures are obtained along the vertical line B-B when the current of the power supply is constant at −0.002 A. FIG. 9 shows the relationship between the diode voltage and the diode temperature when the current is −0.002 A. Therefore, when the temperature is to be measured, the diode voltage can be calculated using the approach described earlier, and the temperature of the image sensor can be obtained by matching the calculated diode voltage against look-up table values and interpolating if necessary.

Temperature-sensor diode 106 and diode-connected transistor 102 may be designed so that when diode-connected transistor 102 is in an ON state, the leakage current from temperature-sensor diode 106 is small compared to the current $I_0$ flowing through the diode-connected transistor 102 and resistor 104. In addition, transistor 102 may have a lower impedance than the resistance value of resistor 104, allowing the calculation of the resistance of resistor 104 to be accurate.

Figure 10:
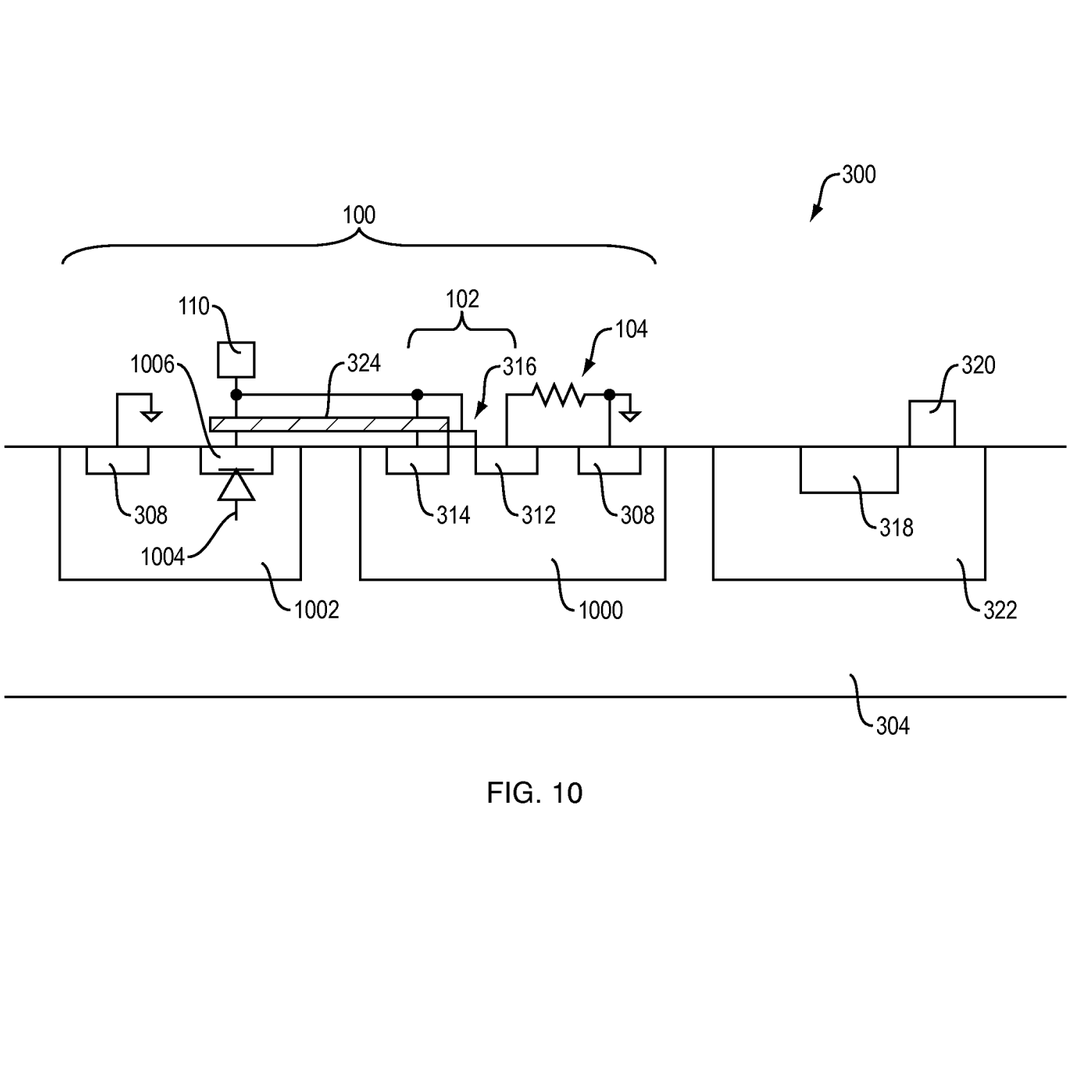
FIG. 10 is a cross-sectional view of a portion of a second integrated circuit that includes device identification and temperature sensor circuit 100 in an embodiment in accordance with the invention.

FIG. 10 is a cross-sectional view of a portion of a second integrated circuit that includes device identification and temperature sensor circuit 100 in an embodiment of the invention. The integrated circuit shown in FIG. 10 is identical to the integrated circuit of FIG. 3 except the p-type well 302 in FIG. 3 is replaced with two separate, individual p-type wells 1000 and 1002. The p-type well 1000 is used to form the temperature-sensor diode 106 and the p-type well 1002 is used to form the diode-connected transistor 102. The separate wells 1000, 1002 can reduce the crosstalk between the temperature-sensor diode 106 and diode-connected transistor 102. The temperature-sensor diode 1004 is formed by the p-type well 1000 and n-select region 1006. Both p-type wells 1000, 1002 are tied to ground through p-select region 308.

In some embodiments, the temperature diode 1006 is covered by an opaque layer 324 to prevent light from impinging on the region of temperature diode 1006, thereby preventing generation of a photocurrent through the diode. This photocurrent would increase the diode forward current when the diode is turned on by a negative voltage applied to the bond pad 110, so that the I-V curves shown in FIGS. 6 and 8 would change as the light level varies. The opaque layer 324 can be a metal layer such as tungsten or aluminum, or a color filter material. Typically there will be openings (not shown) in the opaque layer 324 to allow connections within the circuit 100 to be made without causing any shorts.

Since the drain region 314 of the transistor 102 also forms a p-n junction diode connecting to the temperature diode 1006, its current also contributes to the total current of the temperature diode. Therefore, opaque layer 324 may cover the drain region 314 as well, as shown in FIG. 10. More generally, opaque layer 324 can cover a larger region than that shown in FIG. 10. For example, opaque layer 324 may cover the temperature diode 1006 as well as transistor 102, and the region surrounding these components, or, indeed, the entire circuit 100.

Figure 11:
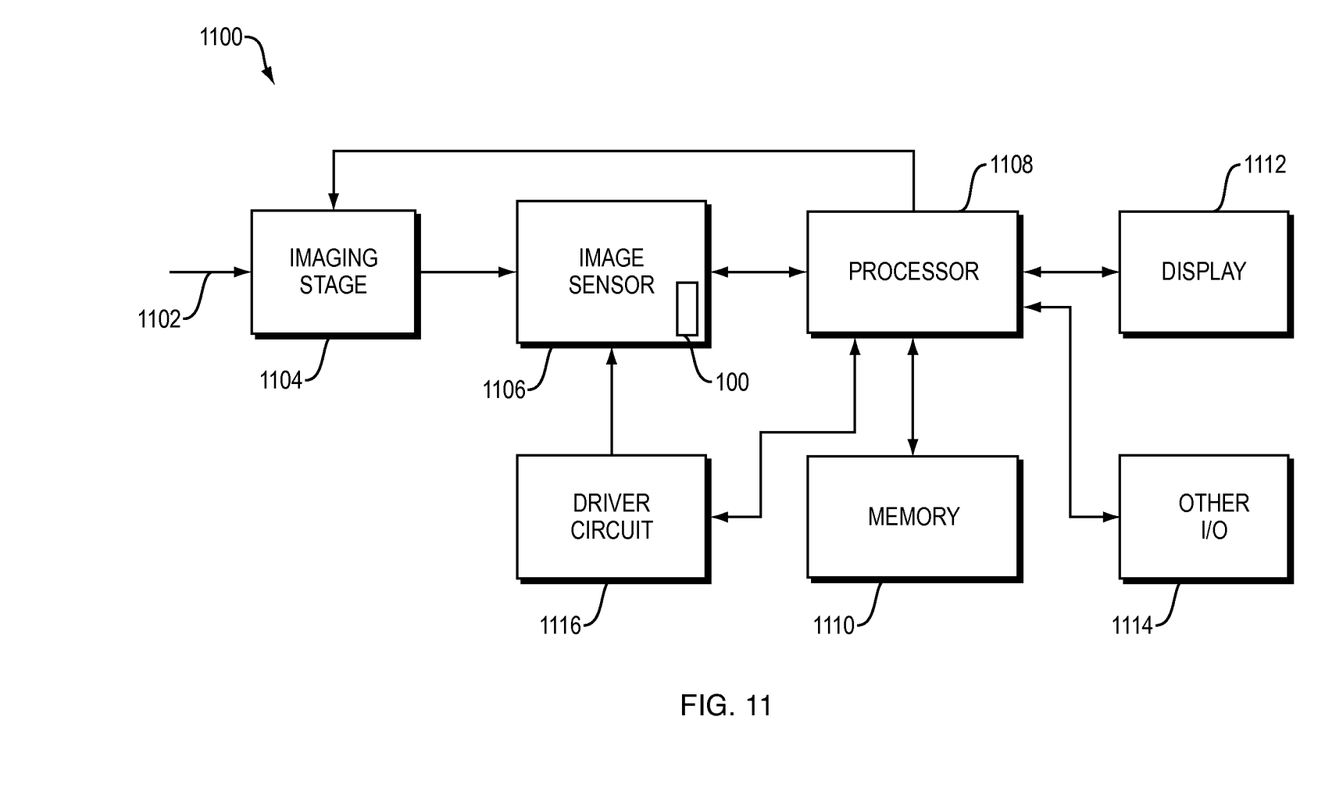
FIG. 11 is a simplified block diagram of an image-capture device in an embodiment in accordance with the invention.

Refer now to FIG. 11, which depicts a simplified block diagram of an image-capture device in an embodiment in accordance with the invention. Image-capture device 1100 is implemented as a digital camera in FIG. 11. Those skilled in the art will recognize that a digital camera is only one example of an image-capture device that can utilize an image sensor incorporating the present invention. Other image-capture devices, such as, for example, cellphone cameras, digital video camcorders, and other hand-held devices can be used with the present invention.

In digital camera 1100, light 1102 from a subject scene is received at an imaging stage 1104. Imaging stage 1104 can include conventional elements such as a lens, a neutral density filter, an iris and a shutter. Light 1102 is focused by imaging stage 1104 to form an image on image sensor 1106. Image sensor 1106 captures one or more images by converting the incident light into electrical signals. By way of examples only, image sensor 1106 can be implemented as a CCD image sensor or a CMOS image sensor. Image sensor 1106 includes device identification and temperature sensor circuit 100 shown in FIG. 1.

Digital camera 1100 further includes processor 1108, memory 1110, display 1112, and one or more additional input/output (I/O) elements 1114. Although shown as separate elements in the embodiment of FIG. 11, imaging stage 1104 may be integrated with image sensor 1106, and possibly one or more additional elements of digital camera 1100, to form a compact camera module.

Processor 1108 may be implemented, for example, as a microprocessor, a central processing unit (CPU), an application-specific integrated circuit (ASIC), a digital signal processor (DSP), or other processing device, or combinations of multiple such devices. Various elements of imaging stage 1104 and image sensor 1106 can be controlled by timing signals or other signals supplied from processor 1108.

Memory 1110 can be configured as any type of memory, such as, for example, random access memory (RAM), read-only memory (ROM), Flash memory, disk-based memory, removable memory, or other types of storage elements, in any combination. Memory 1110 can store the list of known resistance values and integrated circuits that correspond to the resistance values that can be used when identifying an integrated circuit.

A given image captured by image sensor 1106 may be stored by processor 1108 in memory 1110 and presented on display 1112. Display 1112 is typically an active-matrix color liquid-crystal display (LCD), although other types of displays may be used. The additional I/O elements 1114 may include, for example, various on-screen controls, buttons or other user interfaces, network interfaces, or memory card interfaces, or even voice command controls.

Driver circuit 1116 may include a power supply and a resistor (not shown). The power supply and resistor can be implemented as $V_{DC}$ and resistor 402 shown in FIGS. 4 and 5. Thus, the power supply may be used to apply voltages to common node 108 (FIG. 1).

Processor 1108 controls driver circuit 1116 either to calculate a resistance value of the resistor (i.e., resistor 104 in FIG. 1) in the device-identification circuit by providing a positive voltage, or to measure the temperature of image sensor 1106 by providing a negative voltage. Once the resistance value of the resistor (i.e., resistor 104) in the device-identification circuit is determined, processor 1108 can recognize image sensor 1106 and set up the correct camera file and timing for image sensor 1106 automatically. By controlling driver circuit 1116, processor 1108 can continuously or periodically monitor the temperature of image sensor 1106 using device identification and temperature sensor circuit 100 and pre-determined comparison data sets stored in memory 1110. Based on the temperature measured, processor 1108 can control driver circuit 1116 to operate the image sensor 1106 in a safe or optimal manner. For example, if the temperature of image sensor 1106 is too high, processor 1108 can control driver circuit 1116 to turn off the power supply to the image sensor 1106 to prevent damage thereto, or to start a cooling process if there is a cooler attached to image sensor 1106. In addition, processor 1108 can perform one or more algorithms to improve the image quality by compensating for the measured temperature. For example, the dark current may be estimated based on the temperature measurement (since the dark current in the image sensor 1106 increases with temperature) and subtracted from image signals.

It is to be appreciated that the digital camera shown in FIG. 11 may comprise additional or alternative elements of a type known to those skilled in the art. For example, a thermoelectric cooling unit can be attached on the back of the image sensor 1106 inside the digital camera. The cooling unit can be used to cool the image sensor whenever it is needed based on the temperature reading. Elements not specifically shown or described herein may be selected from those known in the art. As noted previously, the present invention may be implemented in a wide variety of image-capture devices. Also, certain aspects of the embodiments described herein may be implemented at least in part in the form of software executed by one or more processing elements of an image-capture device. Such software can be implemented in a straightforward manner given the teachings provided herein, as will be appreciated by those skilled in the art.

The invention has been described in detail with particular reference to certain embodiments thereof, but it will be understood that variations and modifications can be effected within the spirit and scope of the invention. For example, the structure of the device-identification and temperature-sensor circuit has been described as having certain conductivity types. In particular, an NMOS transistor 102 built in a p-type well. However, other embodiments in accordance with the invention are not limited to this construction. The conductivity types can be reversed in other embodiments. The identification resistor is described as made by polysilicon material, but other materials can also be used to make the resistor. In addition, both the device-identification resistor and the temperature sensor are shown as connected to ground, but they can be tied to suitable reference voltage.

And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

What is claimed is:

1. An integrated circuit, comprising thereon:
a device-identification circuit for identifying the integrated circuit, the device-identification circuit having a first polarity;
a temperature sensor connected in parallel with the device-identification circuit for determining a temperature of the integrated circuit, the temperature sensor having a second polarity that is different than the first polarity; and
an opaque layer covering at least the temperature sensor to prevent photocurrent generation therein;
the temperature sensor being configured to operate in response to a first signal and the device identification circuit being configured to be nonoperational in response to the first signal; and
the device-identification circuit being configured to operate in response to a second signal different than the first signal and the temperature sensor being configured to be nonoperational in response to the second signal.

2. The integrated circuit of claim 1, wherein the device-identification circuit comprises a resistor connected to a diode-connected transistor.

3. The integrated circuit of claim 2, wherein the temperature sensor is a diode.

4. The integrated circuit of claim 1, wherein the integrated circuit comprises an image sensor.

5. The integrated circuit of claim 1, further comprising a bond pad configured to receive the first signal and the second signal, the device-identification circuit being coupled to the bond pad and the temperature sensor being coupled to the bond pad.

6. An integrated circuit, comprising thereon:
a device-identification circuit comprising a resistor connected between a diode-connected transistor and a first reference voltage, wherein the diode-connected transistor has a first polarity relative to the first reference voltage,
a temperature sensor diode connected in parallel with the device-identification circuit and having a second polarity being different than the first polarity relative to a second reference voltage, and
an opaque layer covering at least the temperature sensor to prevent photocurrent generation therein.

7. The integrated circuit of claim 6, wherein the integrated circuit comprises an image sensor.

8. The integrated circuit of claim 6, wherein the first and second reference voltages are the same.

9. The integrated circuit of claim 8, wherein the first and second reference voltages are ground.

10. A system for identifying a device and to measure its temperature, the system having a power supply connected to a common node and comprising:
a device-identification circuit connected between the common node;
a temperature sensor in parallel with the device-identification circuit and coupled to the common node, and
an opaque layer covering at least the temperature sensor to prevent photocurrent generation therein:
the device-identification circuit configured to be placed in an ON state in response to a first voltage having a first polarity and the temperature sensor being configured to be placed in an OFF state in response to the first voltage, and
the temperature sensor configured to be placed in an ON state in response to a second voltage having a second polarity and the device-identification circuit being configured to be placed in an OFF state in response to the second voltage; wherein the second and first polarity is different.

11. The system of claim 10, wherein the device-identification circuit includes a diode-connected transistor connected to a resistor, the diode-connected transistor having a first polarity and being connected to the common node, and the resistor being connected between the diode-connected transistor and the first reference voltage.

12. The system of claim 11, wherein the temperature sensor is a diode having a second polarity.

13. The system of claim 10, further comprising a second resistor connected between the power supply and the common node.

14. The system of claim 13, wherein the power supply and the second resistor are disposed in an image-capture device.

15. The system of claim 14, wherein the device-identification circuit and the temperature sensor diode are disposed in an image sensor.

16. The integrated circuit of claim 15, further comprising a bond pad, the device-identification circuit being coupled to the bond pad and the temperature sensor diode being coupled to the bond pad.

17. The system of claim 10, further comprising:
a processor connected to the integrated circuit;
a memory connected to the processor; and
a driver circuit connected to the processor and to the integrated circuit.

18. The system of claim 17, wherein the memory contains a look-up table relating different resistance values to associated devices, the processor being configured to identify the device based on a substantial match between a value in the look-up table and a value of the identification-circuit resistor.

19. The system of claim 17, wherein the memory contains a look-up table relating different values of an electrical parameter of the temperature sensor to associated temperatures, the processor being configured to identify a device temperature based on a substantial match between a present value of the electrical parameter and a value in the look-up table.

20. The system of claim 19, wherein the sensor comprises a diode and the electrical parameter is current through the diode.

21. The system of claim 19, wherein the sensor comprises a diode and the electrical parameter is voltage across the diode.

22. The system of claim 21, wherein the temperature sensor is coupled between the common node and a second reference voltage.

23. The system of claim 10, wherein the first and second reference voltages are the same.

24. The system of claim 23, wherein the first and second reference voltages are ground.

25. A method for identifying an integrated circuit and determining its temperature a temperature of the integrated circuit, the method comprising:

using an identification circuit of the integrated circuit to identify the integrated device; and using a temperature sensor of the integrated circuit to determine the temperature of the integrated circuit;

wherein light is blocked from at least the temperature sensor to prevent photocurrent generation therein, operating the identification circuit to identify the integrated circuit while simultaneously not operating the temperature sensor, and operating the temperature sensor to determine the temperature of the integrated circuit while simultaneously not operating the identification circuit; wherein operating the identification circuit and the temperature sensor using different polarity signal.

26. The method of claim 25, wherein the device-identification circuit comprises a resistor connected to a diode-connected transistor.

27. The method of claim 26, further comprising determining a resistance value of the resistor included in the device-identification circuit, the integrated circuit being identified based on the determined resistance value.

28. The method of claim 25, wherein the temperature sensor is a diode connected in parallel with the device-identification circuit.

29. The method of claim 28, wherein the device-identification circuit and the temperature sensor diode are connected to a common node, the method further comprising applying a first voltage to the common node to place (i) the device identification circuit in an ON state to identify the integrated circuit and (ii) the temperature sensor diode in an OFF state.

30. The method of claim 25, further comprising applying a second voltage to the common node to place (i) the device-identification circuit in an OFF state and (ii) the temperature sensor diode in an ON state to determine a temperature of the integrated circuit.

31. The method of claim 25, wherein temperature is measured by measuring an electrical parameter of the temperature sensor, comparing the measured parameter against a plurality of parameter values associated with known temperatures, and determining the temperature of the integrated circuit based on the comparison.

32. The method of claim 31, wherein the temperature sensor comprises a diode and the electrical parameter is current through the diode.

33. The method of claim 31, wherein the temperature sensor comprises a diode and the electrical parameter is voltage across the diode.

34. The method of claim 25 wherein the device-identification circuit and the temperature sensor are connected in parallel.

* * * * *